United States Patent [19]

Letourneux et al.

[11] Patent Number: 5,443,730

[45] Date of Patent: * Aug. 22, 1995

[54] PROCESS FOR THE PURIFICATION OF A POLLUTED AQUEOUS EFFLUENT

[75] Inventors: Jean-Pierre Letourneux, Montelimar; Alain Bourdeau, Pierrelatte, both of France

[73] Assignee: Lafarge Fondu International, Neuilly sur Seine, France

[ * ] Notice: The portion of the term of this patent subsequent to Nov. 30, 2010 has been disclaimed.

[21] Appl. No.: 87,096

[22] Filed: Jul. 7, 1993

Related U.S. Application Data

[63] Continuation-in-part of Ser. No. 53,978, Apr. 26, 1993, abandoned, which is a continuation of Ser. No. 817,808, Jan. 8, 1992, abandoned.

[30] Foreign Application Priority Data

Jan. 8, 1991 [FR] France .................. 91 00260
Nov. 20, 1992 [FR] France .................. 92 14002

[51] Int. Cl.$^6$ .................. C02F 1/52; C02F 1/58
[52] U.S. Cl. .................. 210/631; 210/713; 210/726; 210/723
[58] Field of Search .......... 210/723, 631, 665, 669, 210/667, 713, 726

[56] References Cited

U.S. PATENT DOCUMENTS 5,266,201 11/1993 Letourneaux et al. .......... 210/620

FOREIGN PATENT DOCUMENTS 0250626 1/1988 European Pat. Off. .......... 210/721
49858 5/1978 Japan .

OTHER PUBLICATIONS

Translation: Japanese Laid Open Patent Application No. 53/049858 Published May 6, 1978 Ikari et al., inventors. Agency of Industrial Science & Technology et al, applicant.

Primary Examiner—Neil McCarthy
Attorney, Agent, or Firm—Millen, White, Zelano, & Branigan

[57] ABSTRACT

The invention relates to a process for the purification of a polluted aqueous effluent to obtain an overall reduction in its chemical oxygen demand. The aqueous effluent is introduced into a reactor. Added to the reactor is a reagent comprising an agent supplying active alumina and lime. The reaction forms mineral sludge and an effluent. The mineral sludge and supernatant effluent are then extracted by decantation or filtration.

19 Claims, 1 Drawing Sheet

PROCESS FOR THE PURIFICATION OF A POLLUTED AQUEOUS EFFLUENT

CROSS-REFERENCE TO RELATED APPLICATIONS

This application is a continuation-in-part of application Ser. No. 08/053,978, filed Apr. 26, 1993, now U.S. Pat. No. 5,266,201, issued Nov. 30, 1993, which is a continuation of application Ser. No. 07/817,808, filed Jan. 8, 1992, now abandoned.

BACKGROUND OF THE INVENTION

This invention relates to a purification process for a polluted aqueous effluent to lower its chemical oxygen demand (COD).

Large volumes of polluted water from urban waste water, industrial effluents, and the treatment of biological liquids, such as liquid manure, cannot be discharged or reused without having undergone preliminary purification. Frequently, the purification treatment focuses on the elimination of nitrates, the polluting effects of which are significant and well known. However, nitrates are not the only polluting elements; many effluents should be purified even if they do not contain nitrates. Polluted aqueous effluents can, furthermore, come from aqueous media that initially contain nitrates and which have already been subjected to preliminary purification, resulting in the elimination of nitrates. In particular, for the treatment of biological waste, for example, nitrified liquid manure, there are processes which result in the almost-complete elimination of nitrates.

Various processes for the reduction of COD have been proposed, for example, for the treatment of waste water. JP-53-049858 relates to a process for the purification of waste water in which, after a biological treatment step, the effluents are treated by an adsorbing agent. This adsorbing agent is a dehydrated solid coprecipitate, such as the calcium aluminate obtained by the reaction of $NaAlO_2$ and $CaCl_2$. According to FR 2,671,791, it is possible to eliminate sulfate ions by precipitating the latter with calcium aluminates.

SUMMARY OF THE INVENTION

An object of the invention is to provide a process for the purification of polluted aqueous effluents by trapping a large variety of organic or mineral polluting substances contained in an effluent. This purification produces an overall reduction in COD.

Upon further study of the specification and appended claims, further objects and advantages of this invention will become apparent to those skilled in the art.

According to this purification process, polluted aqueous effluent is contacted with a reagent consisting of active alumina and quick or hydrated lime, able to form complex hydrated calcium aluminates with the anions initially present in the effluent. Surprisingly, this purification process facilitates the separation of a large variety of inorganic or organic anions, simultaneously trapping many non-ionic organic substances. It is thus possible to obtain purified effluent free of many organic substances which greatly contribute to the COD of the polluted effluent. These substances are trapped in the mineral sludge.

The trapped anions can be organic anions such as, for example, monocarboxylates or dicarboxylates, phenylcarboxylates or hydroxycarboxylates. Anions from inorganic salts, such as, for example, halides, borates, sulfites, sulfates, chromates, selenates, permanganates, chlorates, iodates, and carbonates, can also be trapped. A reduction in or even the elimination of organic substances, such as, for example, bilirubin, proteins, and glucose, is also achieved.

The addition of active alumina is accompanied by the addition of lime to obtain a $CaO/Al_2O_3$ ratio close to the stoichiometric composition of the hydrates to be precipitated.

In a preferred embodiment, the polluted aqueous effluent undergoes pretreatment in ferric chloride before the addition of active alumina and lime. By precisely apportioning the added ferric chloride, a significant reduction in COD is obtained without excessively increasing the chloride concentration.

According to another embodiment, the polluted aqueous effluent undergoes pretreatment with lime, which makes it possible to precipitate the phosphates and carbonates in the form of insoluble calcium salts.

The cost effectiveness of the process is improved by subjecting the polluted aqueous effluent to pretreatment with a used reagent from a previous treatment of a polluted effluent.

The process of the invention is advantageously conducted at a temperature of 25°–35° C. It is particularly well suited to the treatment of a polluted aqueous effluent resulting from denitrification treatment of nitrified manure employed for the elimination of nitrates.

To simplify the expression of the formulae, the following cement manufacturer abbreviations:

C represents CaO and

A represents $Al_2O_3$ are used below to designate calcium and aluminum compounds such as $C_3A$ and $C_{12}A_7$.

The active alumina of the reagent used in the purification process of the invention is a source of alumina, which reacts with the soluble salts present in the effluent and produces aluminates. The active alumina is added either directly or through one or more compounds that can release it, for example, calcium aluminates. The reactions which occur result in the formation of hydrates of the formulae:

$C_3A$. CaX. $nH_2O$ or $C_3A$. $CaY_2$. $nH_2O$ where X and Y are trapped bivalent and monovalent anions.

In a preferred embodiment, the active alumina is added by $C_3A$. Good results are also obtained when the reagent contains $C_{12}A_7$. The aluminates formed are then the same as those obtained with $C_3A$. It is also possible to obtain good results using a $C_3A/C_{12}A_7$ mixture for the addition of active alumina. The use of certain anions, such as sulfates, result in the formation of trisubstituted compounds of the formulae:

$C_3A$. 3CaX. $nH_2O$ or $C_3A$. $3CaY_2$. $nH_2O$.

In a preferred embodiment, the polluted aqueous effluent is introduced into a reactor and optionally pretreated with lime or ferric chloride; then the reagent formed from the mixture [$C_3A+C_{12}A_7$ and lime] is added. The whole is stirred during the reaction time, which varies from about 1 hour to about 10 hours, depending on the amount of reagent used and the quality of the treatment desired. A precipitate, on the one hand, and a clear effluent, on the other hand, are formed during the reaction. The precipitate, constituting mineral sludge, and the clear supernatant effluent are separated by decantation. The mineral sludge optionally undergoes further filtration and can be used, for example, as a non-polluting soil conditioner. The supernatant effluents, having a very low COD and an insignificant biological oxygen demand (BOD), represent very little risk of pollution and can be discharged.

In a particularly advantageous embodiment, to reduce the consumption of reagent, pretreatment of the aqueous effluent is conducted with a used reagent. For this purpose, following treatment of a polluted aqueous effluent in the reactor, the suspension obtained is decanted, thus recovering residual sludge loaded with an already-utilized ("used") reagent. During a later cycle, sludge loaded with used reagent is added to a polluted aqueous effluent, introduced into the reactor. A first decantation is subsequently performed, providing a residual sludge, which is eliminated, and a supernatant formed from pretreated effluent. This pretreated effluent is then treated with a new (i.e., unused) reagent to obtain by decantation a supernatant exhibiting the desired qualities and new mineral sludge loaded with used reagent. The sludge, in turn, is used for the following pretreatment.

BRIEF DESCRIPTION OF THE DRAWING

Various other objects, features and attendant advantages of the present invention will be more fully appreciated as the same becomes better understood when considered in conjunction with the accompanying drawings, in which like reference characters designate the same or similar parts throughout the several views and wherein.

DETAILED DESCRIPTION

Figure 1:
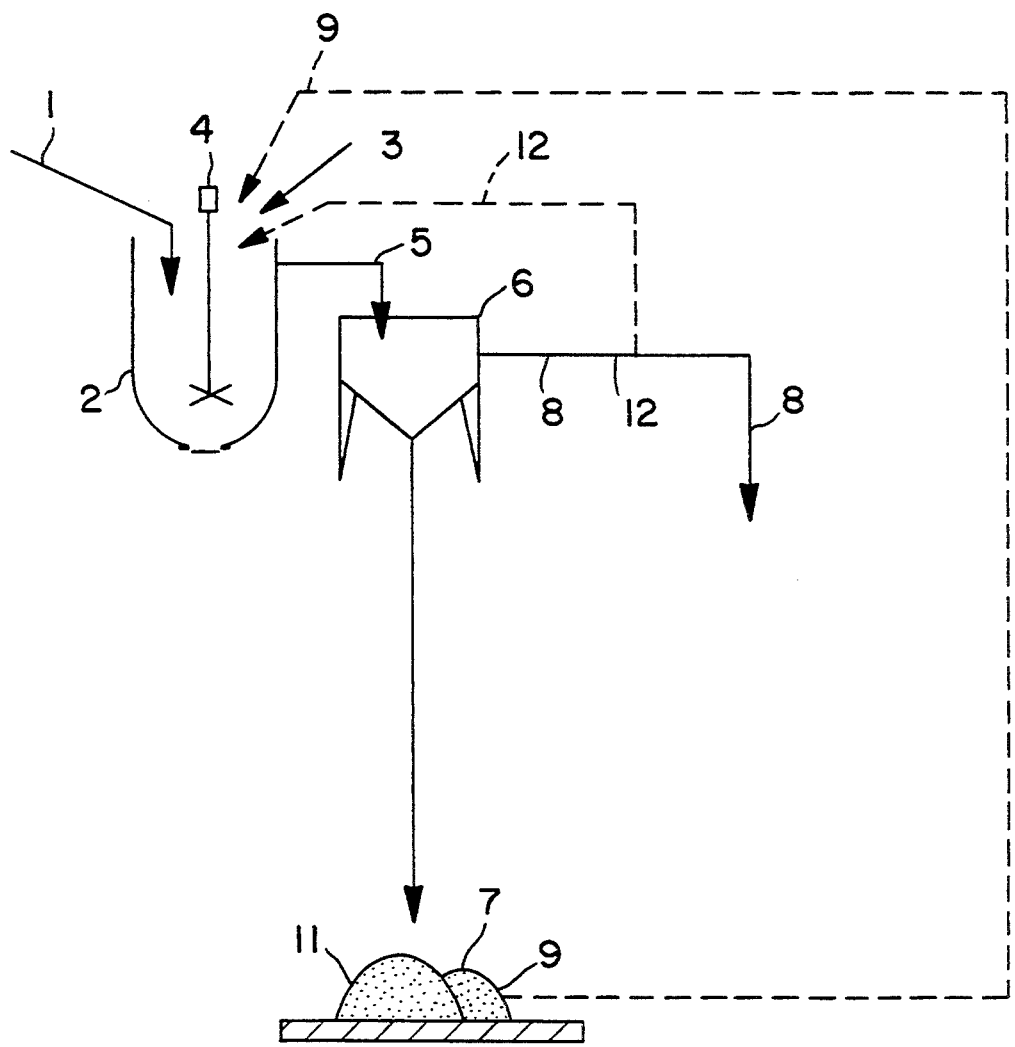
FIG. 1 is a schematic flowsheet of a comprehensive embodiment of the invention.

Polluted aqueous effluent 1 is introduced into a reactor 2, into which a reagent 3 is added, and a stirring mechanism is optionally actuated to facilitate contact of the reagent 3 and the polluted aqueous effluent 1. When the reaction is complete, the resultant precipitate and effluent 5 are introduced into a settling tank (decanter 6) to separate mineral sludge 7 and clear effluent 8.

In the preferred so-called countercurrent embodiment, in which the polluted effluent 1 is pretreated with a used reagent, a part 9 of the mineral sludge 7 from a prior treatment is mixed in the reactor 2 with polluted effluent 1 to be treated. This sludge part 9 comprises the used reagent. As above, stirring mechanism 4 facilitates contact of the polluted effluent 1 to be treated and sludge part 9. After reaction, the resultant precipitate and effluent are introduced into the settling tank 6 to separate the a sludge 11, on the one hand, and a supernatant effluent 12, on the other hand. The supernatant effluent 12 is reintroduced into the reactor 2, where it is combined with fresh reagent 3. The process is then continued, with a stirring mechanism 4 facilitating contact of the reagent 3 with the effluent 12. After reaction, the precipitate and effluent are directed to settling tank 6 and separated into the mineral sludge 7 and a clear supernatant effluent 8. Mineral sludge 11 produced following use of the used reagent 9 is evacuated and cannot serve as used reagent. On the other hand, the sludge 7, produced by action of the used reagent 9 on the pretreated effluent 12, is well suited to this use.

Experience has shown that the purification process of the invention makes it possible to obtain a supernatant exhibiting an insignificant BOD5 and a very low COD, as shown in the examples below. BOD5 is measured herein according to the method of dilutions referenced in Standard AFNOR NFT-90-103. COD is measured by use of reagent in preapportioned tubes and spectrophotometric dosages (with reduction at 150° C. for 2 hours) in accordance with Standard AFNOR NFT-90-101.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding French Applications 91/00260, filed Jan. 8, 1991, and 92/14002, filed Nov. 20, 1992, are hereby incorporated by reference.

EXAMPLES

Example 1

The treatment of the invention was applied to the effluents of denitrified liquid manure under the following conditions:

Treatment by ($C_3A + C_{12}A_7$) at 8 g/l to which lime is added at 6 g/l.

Reaction Time: 6 hours.

This treatment was followed by a decantation for a period of 12 hours.

The compared properties of the effluents before and after treatment were as follows:

|  | Before treatment | After treatment |
|---|---|---|
| $N-NO_3$ | 0 | 0 |
| $N-K$ | 108 mg/l | 40 mg/l |
| $P_2O_5$ total | 0.75 g/l | 0 |
| pH | 8.5 | 10.5 |
| BOD5 | 210 mg/l | 0 |
| COD | 2,840 mg/l | 265.3 mg/l |

Example 2

The treatment of the invention was applied to effluents of nitrified and denitrified liquid manure under the following conditions:

Pretreatment with lime at 2 g/l.

Treatment by ($C_3A + C_{12}A_7$) at 5 g/l to which lime is added at 5 g/l.

Reaction Time: 7 hours.

Temperature: 30° C.

| Results (mg/l) | Before treatment | After treatment |
|---|---|---|
| $NO_3$ | 17 | 12 |
| Cl | 755 | 588 |
| $SO_4$ | 573 | 0 |
| $PO_4$ | 240 | 0 |
| COD | 2020 | 225 |

Example 3

The treatment of the invention was applied to effluents of nitrified and denitrified liquid manure under the following conditions:

Pretreatment with ferric chloride at 1.35 g/l.
Treatment by ($C_3A + C_{12}A_7$) at 5 g/l to which lime is added at 2 g/l.
Reaction Time: 3 hours.
Temperature: 30° C.

| Results (mg/l) | Before treatment | After treatment |
| --- | --- | --- |
| $NO_3$ | 0 | 0 |
| Cl | 675 | 1150 |
| $SO_4$ | 520 | 0 |
| $PO_4$ | 230 | 0 |
| COD | 2000 | 160 |

(Increase in the chloride concentration because of the addition of ferric chloride.)

Example 4

The treatment of the invention was applied to effluents of nitrified and denitrified liquid manure under the following conditions:

Pretreatment by ($FeCl_3$) at 4 g/l.
Treatment by ($C_3A + C_{12}A_7$) at 2 g/l to which lime is added at 5 g/l.
Reaction Time: 1.5 hours.
Temperature: 30° C.

| Results (mg/l) | Before treatment | After treatment |
| --- | --- | --- |
| $NO_3$ | 0 | 0 |
| Cl | 675 | 2420 |
| $SO_4$ | 520 | 0 |
| $PO_4$ | 230 | 0 |
| COD | 2000 | 75 |

(Very great increase in the chloride concentration because of the addition of ferric chloride.)

Example 5

The countercurrent-type treatment of the invention was applied to effluents of nitrified and denitrified liquid manure under the following conditions:

Pretreatment: sludge recovered from a previous treatment (1.5 hours). The decantation results in a pretreated supernatant and in a sludge which is the final residue of the treatment.
Treatment by ($C_3A + C_{12}A_7$) at 5 g/l to which lime is added at 5 g/l.
Reaction Time: 1.5 hours.
Temperature: 30° C.

| Results (mg/l) | Before treatment | After treatment |
| --- | --- | --- |
| $NO_3$ | 0 | 0 |
| Cl | 720 | 475 |
| $SO_4$ | 530 | 0 |
| $PO_4$ | 220 | 0 |
| COD | 2100 | 160 |

(Optimization of the effect of the reagent, with a good elimination of the anions and the COD.)

At the end of the reaction, the decantation of the suspension provides:

a clear effluent, without phosphate or sulfate, with low chloride content and COD, and a sludge that can be used for the pretreatment of a new amount of liquid manure.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A process of purification of a polluted aqueous effluent to lower COD therein, said polluted aqueous effluent comprising air least one organic or inorganic anion selected from the group consisting of monocarboxylates, dicarboxylates, phenylcarboxylates, hydroxycarboxylates, borates, nitrates, phosphates, chromates, selenates, permanganates, chlorates, iodates, and carbonates, said process comprising:

introducing into said polluted aqueous effluent a reagent comprising an agent supplying active alumina and quick or hydrated lime in sufficient proportions so that said reagent in said aqueous effluent reacts to form a complex hydrate with at least one of said anions resulting in a precipitate constituting mineral sludge and a supernatant effluent, and separating resultant mineral sludge from said supernatant effluent.

2. A process according to claim 1, wherein, during the reaction, nonionic organic substances are trapped in the mineral sludge.

3. A process according to claim 2, wherein said nonionic organic substances are glucoses or proteins.

4. A process according to claim 1, wherein a complex hydrate is formed of at least one anion selected from the group consisting of monocarboxylates, dicarboxylates, phenylcarboxylates, hydroxycarboxylates, or mixtures thereof.

5. A process according to claim 4, wherein a complex hydrate is formed of at least one anion selected from the group consisting of borates, nitrates, phosphates, chromates, selenates, permanganates, chlorates, iodates, carbonates and mixtures thereof.

6. A process according to claim 1, wherein before the addition of active alumina and lime, the polluted aqueous effluent is pretreated with ferric chloride.

7. A process according to claim 1, wherein before the addition of active alumina, the polluted aqueous effluent is pretreated with lime.

8. A process according to claim 1, wherein the polluted aqueous effluent is pretreated with a used reagent directly resulting from a previous treatment of a polluted effluent by active alumina.

9. A process according to claim 1, wherein the polluted aqueous effluent is an effluent resulting from the treatment of nitrified liquid manure by a biological process for the elimination of nitrates.

10. A process according to claim 1, wherein the process is conducted at a temperature between 25° and 35° C.

11. A process according to claim 1, wherein the agent comprises (a) lime and (b) $C_3A$, $C_{12}A_7$, or a mixture thereof, wherein C represents CaO, and A represents Al$_2$O$_3$.

12. A process according to claim 8, wherein the used reagent was used in only one previous treatment.

13. A process according to claim 12, wherein the agent comprises (a) lime and (b) C$_3$A, C$_{12}$A$_7$, or a mixture thereof, wherein C represents CaO, and A represents Al$_2$O$_3$.

14. A process according to claim 1, wherein the polluted aqueous effluent is a denitrified effluent.

15. A process according to any of claim 14, wherein the polluted aqueous effluent is pretreated with a used reagent resulting from a previous treatment of a polluted effluent by active alumina.

16. A process according to claim 15, wherein the used reagent was used in only one previous treatment.

17. In a process of purification of a polluted aqueous effluent to lower COD therein, said polluted aqueous effluent comprising at least one organic or inorganic anion selected from the group consisting of monocarboxylates, dicarboxylates, phenylcarboxylates, hydroxycarboxylates, halides, borates, sulfites, sulfates, chromates, selenates, permanganates, chlorates, iodates, and carbonates, said process comprising:

introducing into said polluted aqueous effluent a reagent comprising an agent supplying active alumina and quick or hydrated lime in sufficient proportions to react in said aqueous effluent to form a complex hydrate with at least one of said anions, resulting in a precipitate constituting mineral sludge and a supernatant effluent, and separating resultant mineral sludge from said supernatant effluent, the improvement comprising pretreating said aqueous effluent with a used reagent directly resulting from a previous treatment of a polluted effluent by active alumina.

18. A process according to claim 17, wherein the used reagent was used in only one previous treatment.

19. A process according to claim 18, wherein the polluted aqueous effluent is a denitrified effluent.

* * * * *